May 27, 1958 H. MITTAG ET AL 2,835,916
COMBINATION SPRAY AND WIPER ARRANGEMENT FOR
WINDSHIELDS AND THE LIKE
Filed June 27, 1955 2 Sheets-Sheet 1
FIG.1 FIG.2 FIG.3
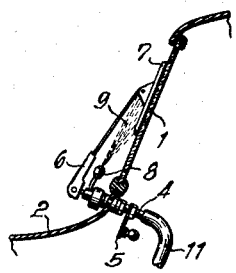
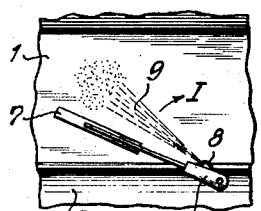
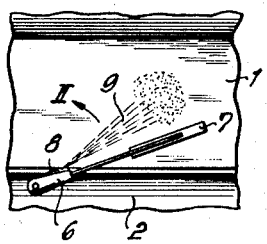
FIG.4
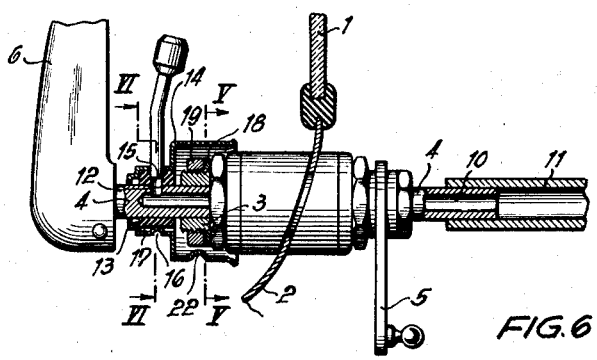
FIG.5 FIG.7 FIG.6
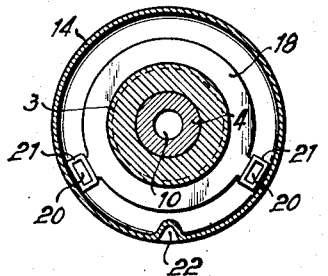
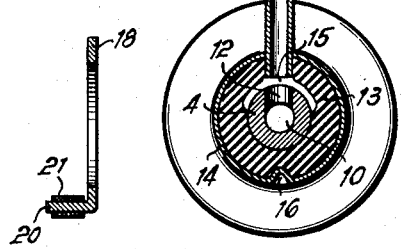
INVENTOR
Hermann Mittag
Gottlob Bacher
by:
Michael S. Striker
att.

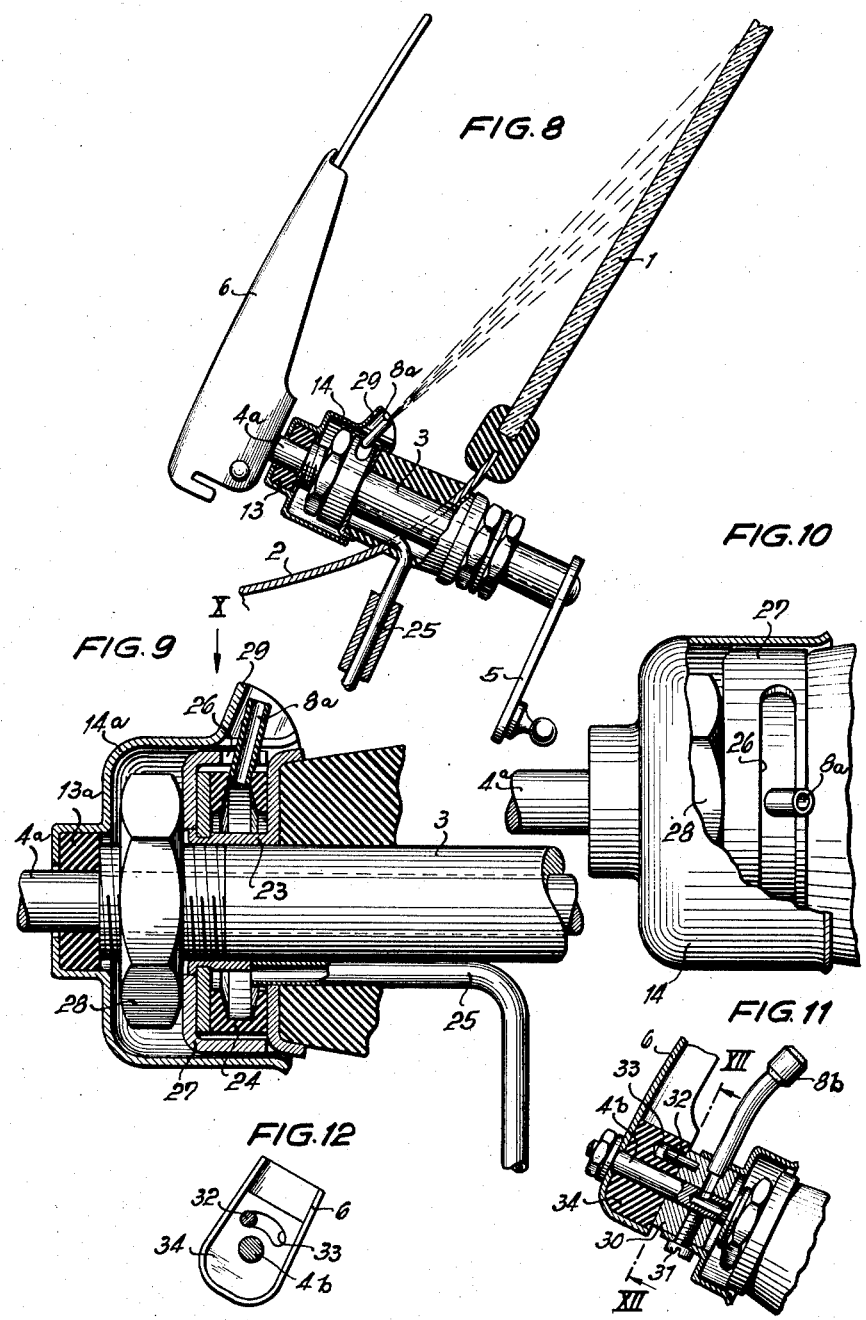

United States Patent Office 2,835,916
Patented May 27, 1958

2,835,916

COMBINATION SPRAY AND WIPER ARRANGEMENT FOR WINDSHIELDS AND THE LIKE

Hermann Mittag, Stuttgart-Botnang, and Gottlob Bacher, Stuttgart-Weilimdorf, Germany, assignors to Robert Bosch G. m. b. H., Stuttgart, Germany Application June 27, 1955, Serial No. 518,212

Claims priority, application Germany June 29, 1954

5 Claims. (Cl. 15—250.4)

The present invention relates to structures for cleaning sheets of glass such as the windshield of a vehicle, for example.

Devices for cleaning such sheets are already known and in general includes structure for spraying a cleaning liquid onto the sheet and a wiper for wiping the sheet. The known device for accomplishing these results have certain drawbacks, however. Thus, for example, the spraying of the cleaning liquid is not correlated to the movement of the wiper so that liquid is sprayed without being immediately wiped and thus obscures vision. Also, some of the known arrangements for accomplishing this result cause the dirt on the glass sheet to become smeared and to obscure the vision for a considerable period of time.

One of the objects of the present invention is to overcome the above drawbacks by providing an arrangement of the above type which automatically guarantees that vision through a windshield or the like will not be obscured during spraying and wiping of the windshield.

Another object of the present invention is to provide an arrangement of the above type which automatically directs a liquid onto the windshield or the like just ahead of the wiper irrespective of the direction in which the wiper happens to be moving.

A further object of the present invention is to provide an arrangement of the above type which automatically moves the wiper beyond the sprayed liquid at the end of each wiper stroke and otherwise maintains the sprayed liquid ahead of the wiper.

Still another object of the present invention is to provide an arrangement of the above type which maintains the wiper stationary during a short period of time when the sprayed liquid is advanced to a position ahead of the wiper during oscillating strokes of a nozzle for spraying the cleaning agent onto the windshield or the like.

With the above objects in view, the present invention mainly consists of a combination spray and wiper arrangement for windshields and the like, this arrangement including a wiper means for wiping a windshield or the like and a nozzle means for directing a cleaning liquid onto the windshield. A support means supports the wiper means and the nozzle means for oscillation, and a means operatively engages the wiper means and the nozzle means during operation thereof for automatically directing the stream from the nozzle means onto the windshield or the like ahead of the wiper means during the major part of the stroke of the wiper means in each direction.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a fragmentary sectional side elevational view illustrating one arrangement in accordance with the present invention;

Fig. 2 fragmentarily illustrates the relative position of the parts at the end of one stroke thereof;

Fig. 3 fragmentarily illustrates the relative position of the parts at the end of the other stroke thereof;

Fig. 4 is a partly sectional side elevational view on an enlarged scale of one embodiment of the present invention;

Fig. 5 is a sectional view on an enlarged scale taken along the line V—V of Fig. 4 in the direction of the arrows;

Fig. 6 is a sectional view on an enlarged scale taken along the line VI—VI of Fig. 4 in the direction of the arrows;

Fig. 7 is a sectional view through a stop ring shown in Fig. 5;

Fig. 8 is a partly sectional side elevational view of a second embodiment of the present invention;

Fig. 9 is a fragmentary partly sectional view on an enlarged scale showing details of the embodiment of Fig. 8;

Fig. 10 is a top plan view looking downwardly on the structure of Fig. 9 in the direction of arrow X, with parts broken away to clearly show the structure;

Fig. 11 is a partly sectional side elevational view of a third embodiment of the present invention; and Fig. 12 is a sectional view taken along the line XII—XII in the direction of the arrows.

In the description which follows, the structure of the invention is disclosed in association with the windshield of an automobile, but it is to be understood that the combined spray and wiper arrangement of the invention is applicable to other structures.

As is particularly apparent from Figs. 1 and 4, a bearing in the form of a sleeve 3 is fixed in a known way to the hood 2 of the automobile just beneath the windshield 1 thereof, and this bearing sleeve 3 extends through an opening in the hood 2. A shaft 4 extends slidably through the bearing sleeve 3 and is supported for oscillation about its axis by the bearing sleeve 3. The inner end portion of the shaft 4 is fixed to a crank 5 which is connected to further unillustrated structure for angularly oscillating the shaft 4 about its axis. A wiper blade 7 is carried by an arm 6 which is fixed to the outer free end of the shaft 4 for turning movement therewith, and between the arm 6 and the hood a nozzle 8 is located for spraying a cleaning liquid onto the windshield, this nozzle 8 turning together with the wiper for the greatest part of each of its strokes. Thus, it is apparent that elements 3 and 4 form a support means, while element 8 is a nozzle means and elements 6 and 7 are a wiper means, and the nozzle means and wiper means are supported by the support means 3, 4 for oscillation about a given axis.

Fig. 2 illustrates the nozzle means 8 and the wiper means 6, 7 in their left end position when looking toward the windshield from the exterior of the automobile, and Fig. 3 illustrates the wiper means and nozzle means in their right end position. It will be noted that in the left end position shown in Fig. 2 the nozzle 8 is located to the right of the wiper blade 7. These parts maintain this relative position as they turn in the direction of the arrow I of Fig. 2 toward their right end position so that the stream of cleaning liquid 9 engages the windshield just ahead of the wiper blade 7. In this way the cleaning liquid is wiped immediately after it engages the windshield and it is not possible for the operator's vision to be obscured by the liquid as would be the case if the stream of cleaning liquid trailed behind the wiper blade.

As soon as the nozzle 8 reaches the position shown in Fig. 3, this nozzle remains stationary while the wiper means 6, 7 overtakes and passes beyond the nozzle 8 to the position shown in Fig. 3, and then the nozzle 8 and wiper means 6, 7 turn together in the direction of arrow II shown in Fig. 3 without changing their relative angular position until the nozzle 8 again reaches the position shown in Fig. 2. At this time the wiper means 6, 7 again overtakes and passes beyond the nozzle means 8, and the above operations are then repeated. Thus, it is apparent that during the major portion of each stroke of the wiper the nozzle directs a stream of liquid ahead of the wiper. In fact, the nozzle means 8 directs the stream of liquid 9 ahead of the wiper blade 7 until the time that the latter approaches the end position of each of its strokes.

In the embodiment of the invention which is shown in Figs. 4–7, the shaft 4 is hollow in that it is formed with an axial bore 10 which extends almost up to the closed end portion of the shaft 4 which carries the wiper arm 6. The right end of the shaft 4 is open and is connected to a tube 11 which guides a cleaning liquid to the interior of the shaft 4 from any suitable source. The shaft 4 is furthermore formed with a radial bore 12 communicating with the interior of the shaft 4. A rubber ring 13 is stretched about the shaft 4 over the part thereof formed with the radial bore 12 so that the rubber ring 13 frictionally engages the outer surface of the shaft 4. A cap 14 surrounds the rubber ring 13 and carries the nozzle 8. The rubber ring 13 is formed with an arcuate recess 15 which is located over and extends laterally beyond the radial bore 12, as is evident from Fig. 6, and the nozzle 8 extends through the cap 14 and a radial bore of the ring 13 into communication with the recess 15 thereof. At a portion of the cap 14 opposite from the nozzle 8 the cap 14 is formed with an indentation 16 which extends into an axial outer groove 17 formed in the ring 13 (Fig. 4) so that the ring 13 and the cap 14 are not angularly turnable with respect to each other. The shaft 4 extends freely through the cap 14. Because of the frictional engagement between the ring 13 and the shaft 4, this ring 13 as well as the cap 14 and nozzle 8 participate in the angular oscillation of the shaft 4 as long as the elements 8, 13 and 14 are not held against turning movement with the shaft 4.

The cap 14 is provided with an enlarged annular portion which extends to the right beyond the ring 13, as viewed in Fig. 4, and which freely surrounds the left end portion of the bearing sleeve 3. This left end portion of the bearing sleeve 3 is provided with an outer thread and is surrounded by a stop ring 18, this ring 18 being clamped in a desired angular position on the bearing sleeve 3 by a nut 19 which engages the threads of the bearing sleeve and presses the ring 18 against a nut shown just to the right of ring 18 in Fig. 4. The ring 18 is provided with a pair of stop portions 20 which extend at right angles forwardly from the plane in which the remainder of ring 18 is located (Fig. 7), and each stop portion 20 is surrounded by a covering 21 of a plastic or other suitable noise deadening material. Between the stop portions 20 of the ring 18, which are angularly spaced from each other by an angle slightly less than the angle through which the shaft 4 oscillates, the cap 14 is provided with an inwardly extending projection 22 in whose path of turning the stop portions 20 are located. At each stroke the projection 22 of the cap 14 engages one of the stop portions 20 at the covering 21 thereof, and in this way the nozzle 8 is maintained stationary while the shaft 4 continues to turn. The recess 15, shown in Fig. 6, is long enough to provide an uninterrupted full communication between nozzle 8 and bore 10 of the shaft 4 in all positions of the parts. By loosening the nut 19 on the bearing sleeve 3, the stop means 18 may be adjusted so that it is possible to adjust the time when the nozzle means 8 is stopped with respect to the wiper means 6, 7.

When liquid is supplied to the nozzle means 8 and when the shaft 4 is oscillated, the liquid will be directed by the nozzle means 8 onto the windshield to be wiped by the wiper means. If the above described structure is started from the position shown in Fig. 2, then the projection 22 engages the left stop 20, shown in Fig. 5, just before the wiper means 6 reaches the end position shown in Fig. 3. In this way the cap 14, together with the ring 13 and nozzle 8, are held stationary, while the shaft 4 continues to turn and turns the wiper means to the end of its stroke, shown in Fig. 3. When the shaft 4 then turns in the opposite direction in its next stroke, the wiper means and nozzle turn together from the position of Fig. 3 toward that of Fig. 2 until the projection 22 engages the right stop, shown in Fig. 5, and then the wiper means 6, 7 overtakes and passes beyond the nozzle means to the position shown in Fig. 2. Thus, during the major part of each stroke of the wiper means the nozzle directs the liquid 9 just ahead of the wiper blade 7.

The embodiment of Figs. 8–10 includes a bearing sleeve 3 which may be identical with that described above. However, the shaft 4a which extends through the bearing sleeve 3, in the embodiment of Figs. 8–10, is solid rather than hollow. This shaft 4a is fixed to the wiper means 6, 7 in the same way as shaft 4 and is connected by the same crank 5 to an unillustrated source of angular oscillation. The bearing sleeve 3 fixedly carries at its outer surface an outwardly directed annular channel 23 which cooperates with an inwardly directed annular channel 24 made of rubber, in the manner illustrated most clearly in Fig. 9. Thus, the side walls of the inwardly directed channel 24 bear in a fluid tight manner against the inner surface of the side walls of the outwardly directed annular channel 23, and the channel 24 is at the same time turnable with respect to the stationary channel 23. Thus, these channels define between themselves an annular closed chamber, and a conduit 25 located outside of the bearing 3 extends along the latter through one of the walls of the channel 23 into communication with the chamber formed between the channels to provide this chamber with a cleaning liquid from any suitable source. The nozzle means 8a of Figs. 8–10 is in the form of a tube having opposite open ends carried by and communicating with the interior of the channel 24, in the manner shown most clearly in Fig. 9. An annular ring 27 is fixed to the bearing 3 and surrounds the channel 24, and this ring 27 is formed with an elongated slot 26 (Fig. 10) through which the nozzle 8a extends so that the nozzle 8a and channel 24 may turn with respect to channel 23 until the nozzle 8a engages either end of the slot 26. A nut 28 threadedly engages the outer surface of the sleeve 3 to clamp the ring 27 in a given angular position, and of course this nut 28 may be loosened for adjusting the angular position of the ring 27, so that in this way the stop means formed by the ends of the slot 26 of ring 27 may be adjusted. A ring 13a surrounds and is stretched by a portion of the shaft 4a located just to the left of bearing 3, as viewed in Fig. 9, so that the ring 13a is in frictional engagement with the shaft 4a. The ring 13a is located within a cap 14a through which the shaft 4a freely extends, and the cap 14a is suitably curved at 29 to extend about the upper free end portion of the nozzle 8a in order to engage the latter on opposite sides thereof, so that when the cap 14a turns it turns the nozzle 8a and the ring 24 therewith.

During operation the oscillating shaft 4a, because of its frictional connection with the ring 13a, turns the latter together with the cap 14a which transmits the motion from the shaft 4a to the nozzle 8a so as to oscillate the latter together with the shaft 4a. As soon as the nozzle 8a engages either end of the slot 26 the nozzle 8a, together with the ring 24 as well as the cap 14a and ring 13a, remain stationary so that the shaft 4a together with the wiper means continues to turn to overtake and move beyond the nozzle in the same way as the above described embodiment. At the next stroke the nozzle moves from the beginning of the stroke together with and ahead of the wiper means until the nozzle 8a engages the other end of the slot 26 to again be overtaken and passed by the wiper means. The inwardly directed channel 24 may be made of a fairly rigid rubber which has some elasticity.

The embodiment of Figs. 8–10 can be built into existing wiper devices. Furthermore, this particular embodiment presents the advantage of hiding the nozzle 8a from view from the front of the vehicle by the portion 29 of the cap 14a, and furthermore this portion 29 of cap 14a, which is located about and extends beyond the nozzle, protects the latter from becoming injured, as when the automobile is being cleaned.

In the embodiment of the invention illustrated in Figs. 11 and 12, the nozzle 8b is carried by a ring 30 which is fixed to the shaft 4b for angular oscillation therewith by a screw 31. The nozzle 8b communicates through a radial bore of ring 30 with the interior of the shaft 4b, which is hollow in the same way as shaft 4. A pin 32 is fixed to the ring 30 and extends into an arcuate recess 33 whose center of curvature is in the axis of the shaft 4. This recess 33 is formed in a rubber member 34 through which the shaft 4b extends. This rubber member 34 is located with a certain rather small stress about the shaft 4b so that the frictional engagement between member 34 and shaft 4b is fairly small. The member 34 is fixed to the wiper arm 6 in a hollow portion thereof, as is evident from Figs. 11 and 12.

With the embodiment of Figs. 11 and 12, the pressure between the wiper blade of the wiper means and the windshield is great enough to maintain the wiper means stationary while the shaft 4b turns with respect to the member 34. Thus, the wiper means of Figs. 11 and 12 turns with the shaft 4b only when the pin 32 engages an end of the arcuate recess 33 to carry the wiper means around the axis of the shaft 4b together with the nozzle 8b. Thus, with this embodiment, the wiper means will remain stationary when the nozzle means starts to turn along one of its strokes and when the nozzle means 8b has become positioned with respect to the wiper means to direct the liquid ahead of the latter then the pin 32 engages an end of the slot 33 to turn the wiper means directly behind the nozzle means. The parts remain in this angular position up to the end of their stroke and then the wiper means again remains stationary while the nozzle means turns to a position ahead of the same and then the nozzle means and wiper means turn together along the return stroke. Thus, with the embodiment of Figs. 11 and 12, it is the pressure between the wiper blade and the windshield which maintains the wiper means stationary while the shaft 4b turns with respect to the wiper means.

It will be understood that each of the elements described above, or two or more together, may also find a useful application in other types of combination spray and wiper arrangements differing from the types described above.

While the invention has been illustrated and described as embodied in a combination spray and wiper arrangement for windshields or the like, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A combination spray and wiper arrangement for windshields and the like, comprising, in combination, a shaft; bearing means supporting said shaft for angular oscillation about its axis; wiper means for wiping a windshield or the like, said wiper means being fixed to said shaft for oscillation therewith; nozzle means for directing liquid onto the windshield or the like; connecting means frictionally connecting said nozzle means to said shaft for turning movement therewith except when said nozzle means is held against turning movement; and stop means engaging said nozzle means shortly before the end of each stroke of said wiper means for preventing said nozzle means from turning with said shaft as said wiper means approaches the end of each of its strokes.

2. A combination spray and wiper arrangement for windshields and the like, comprising, in combination, a shaft; bearing means supporting said shaft for angular oscillation about its axis; wiper means for wiping a windshield or the like, said wiper means being fixed to said shaft for oscillation therewith; nozzle means for directing liquid onto the windshield or the like; connecting means frictionally connecting said nozzle means to said shaft for turning movement therewith except when said nozzle means is held against turning movement, said connecting means including a rubber ring located about and engaging said shaft; and stop means engaging said nozzle means shortly before the end of each stroke of said wiper means for preventing said nozzle means from turning with said shaft as said wiper means approaches the end of each of its strokes.

3. A combination spray and wiper arrangement for windshields and the like, comprising, in combination, a shaft; bearing means supporting said shaft for angular oscillation about its axis; a wiper assembly for wiping a windshield or the like and a nozzle assembly for directing liquid onto the windshield or the like, only one of said assemblies being fixed to said shaft for turning movement therewith; and control means engaging the other of said assemblies for locating said nozzle assembly in a position where it directs the liquid onto the windshield or the like just ahead of the wiper assembly in both directions of movement of the latter, said control means maintaining said other assembly stationary with respect to said shaft while said one assembly changes its direction of movement, and said control means including a stop member covered with a noise-deadening material.

4. A combination spray and wipwer arrangement for windshields and the like, comprising, in combination, a shaft; bearing means supporting said shaft for angular oscillation about its axis; a wiper assembly for wiping a windshield or the like and a nozzle assembly for directing liquid onto the windshield or the like, only one of said assemblies being fixed to said shaft for turning movement therewith; control means engaging the other of said assemblies for locating said nozzle assembly in a position where it directes the liquid onto the windshield or the like just ahead of the wiper assembly in both directions of movement of the latter, said control means maintaining said other assembly stationary with respect to said shaft while said one assembly changes its direction of movement; and adjusting means engaging said control means for adjusting the periods during which said control means maintains said other assembly stationary.

5. A combination spray and wiper arrangement comprising, in combination, a hollow shaft closed at one end portion thereof and formed adjacent said one end portion with a bore communicating with the interior of said shaft; bearing means supporting said shaft for oscillation about its axis; a wiper fixed to said closed end of said shaft; a rubber ring located about and frictionally engaging said shaft and formed with a radial bore communicating with said shaft bore; a nozzle outlet carried by said rubber ring at said bore thereof and extending outwardly from said ring; a pair of stop members carried by said bearing means and angularly spaced from each other by an angular distance less than that through which said shaft and wiper turn during each stroke; and means fixed to said ring and located between said stop members for alternately engaging the latter as said wiper approaches the end of each of its strokes.

References Cited in the file of this patent

UNITED STATES PATENTS

| | | |
|---|---|---|
| 2,173,021 | Longwell et al. | Sept. 12, 1939 |
| 2,348,502 | Smulski | May 9, 1944 |
| 2,562,819 | Rappl | July 31, 1951 |
| 2,609,561 | Wernig | Sept. 9, 1952 |
| 2,632,911 | Deibel | Mar. 31, 1953 |
| 2,714,739 | Neufeld | Aug. 9, 1955 |
| 2,763,023 | Horton | Sept. 18, 1956 |